(No Model.)

J. B. LONG.
COMBINED WATER FILTER AND COOLER.

No. 354,795. Patented Dec. 21, 1886.

Attest,
E. N. Adams
A. S. Smith

Inventor.
James B. Long,
by R. F. Osgood,
Atty.

UNITED STATES PATENT OFFICE.

JAMES B. LONG, OF ROCHESTER, NEW YORK.

COMBINED WATER FILTER AND COOLER.

SPECIFICATION forming part of Letters Patent No. 354,795, dated December 21, 1886.

Application filed March 4, 1886. Serial No. 193,999. (No model.)

*To all whom it may concern:*

Be it known that I, JAMES B. LONG, of the city of Rochester, in the county of Monroe and State of New York, have invented a certain new and useful Improvement in Combined Water Filters and Coolers; and I do hereby declare that the following is a full, clear, and exact description of the same, reference being had to the drawings accompanying this application.

My improvement relates to a combined water filter and cooler in which the water first passes through a primary filter into an ice-chamber beneath, by which it is cleared of all sediment before reaching the ice; then, after coming in contact with the ice, it overflows the ice-chamber, and, together with water produced from the ice, passes through a secondary filter to the bottom of the receptacle and enters a receiving-chamber, where it is drawn off by a faucet in the usual way.

The invention consists in the special combination of the parts, as hereinafter described.

Figure 1:
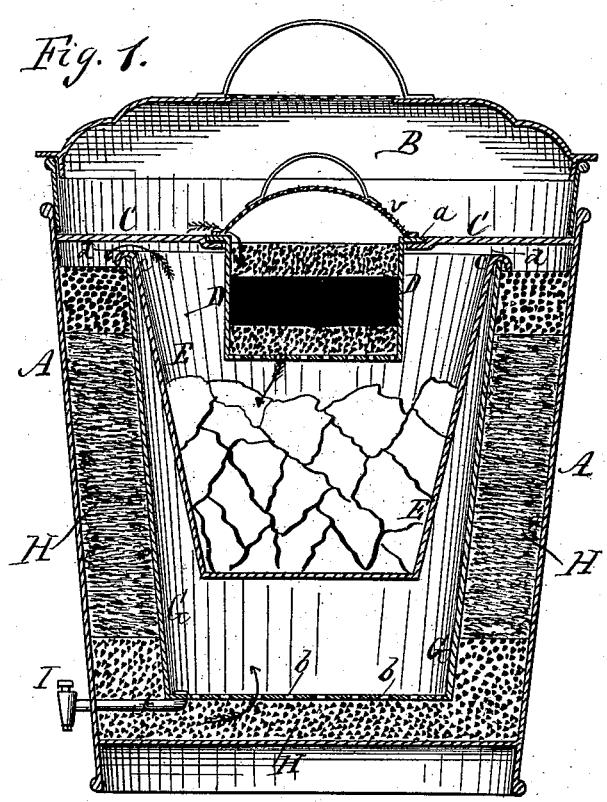
Figure 2:
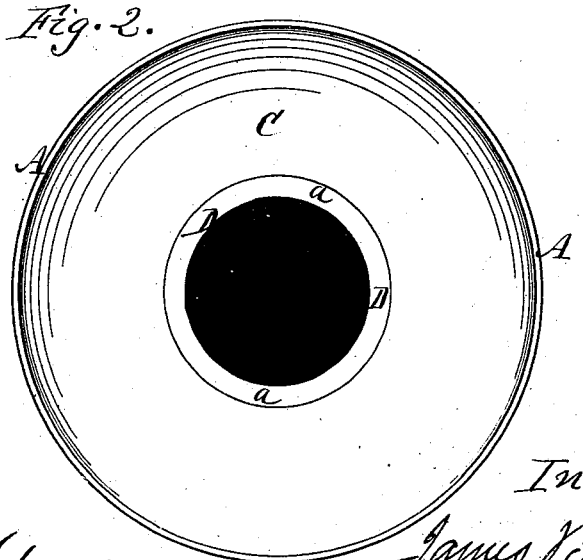

In the drawings, Figure 1 is a central vertical section of the combined filter and cooler. Fig. 2 is a top view with the cover of the outer receptacle removed from place.

A indicates the outer or main receptacle, which is of usual form, preferably made of galvanized iron, but may be made of wood or other suitable material. It is provided with a cover, B, as usual.

C is a water-pan, also of usual form and construction, except that it is not perforated, but has a central large opening in which rests the primary filter, D, which is soldered thereto and made a part of the same.

The filter D consists of a cylindrical vessel provided with a perforated bottom that allows the water to pass through. This primary filter is filled with packing of any suitable kind, preferably alternate layers of gravel and charcoal. The water is poured in the water-pan, as usual, and passing through the primary filter is cleared of all sediment and dirt, and is rendered pure before reaching the ice below.

E is an ice-chamber, and G a water-receptacle beneath the primary filter, and H is a packing around the sides and bottom of the water-receptacle and between it and the outer receptacle, said packing extending to the top of the water-receptacle. The sides and bottom of the ice-chamber are closed; but the bottom of the water-receptacle is perforated, as shown at *b*, to admit water therein after it has passed around through the secondary filter. A space is left between the bottom and sides of the water-receptacle and ice-chamber sufficient to hold the water, and the ice-chamber is supported loosely on top of the water-receptacle by means of a flange, *c*, that rests therein, as shown. The top of the water and ice chambers do not extend clear up to the water-pan, but an overflow-passage, *d*, is left over the top to allow flow of the water from the ice-chamber to the secondary filter.

I is an ordinary faucet connected by a pipe, *f*, with the bottom of the water-receptacle for drawing off the water.

The operation is as follows: The water being poured into the water-pan C runs to the center and passes through the primary filter D into the ice-chamber E, depositing all its sediment, and being rendered comparatively pure before reaching the ice. As it gathers in the ice-chamber it, together with the water produced by the melting of the ice, overflows the top of the ice-chamber and passes out through the overflow-passage *d*, and thence passes down through the secondary filter H, and around the water-receptacle G to the bottom, where it enters the water-receptacle through the perforations *b*. All the water therefrom that enters the water-receptacle is filtered, and the greater portion is double filtered.

The great objection to common water-coolers is that the ice is put directly into the water and drawn off without being filtered, and it is well known that the best ice contains many impurities. It is the object of my invention to produce such a construction of the apparatus that the induction-water can first be filtered in the ordinary way, then be brought in direct contact with the ice, and then be filtered again, which removes all the impurities of the ice-water. This construction is such that the parts can all be readily removed for cleaning as well as for filling the ice-chamber with ice. The ice-chamber can be filled by removing the water-pan and primary filter, and the primary filter can be readily repacked by removing it with the water-pan and turning it bottom upward, having previously removed its cover $v$ at the top.

Having described my invention, I do not claim, broadly, a filtering-tube attached to the water-pan; but

What I claim as new, and desire to secure by Letters Patent, is—

In a combined filter and cooler, the combination of the water-pan provided with a central filtering-tube, and an ice-chamber and water-receptacle directly below the filtering-tube, the ice-chamber resting directly in the water-receptacle, an overflow-passage being left at the top of the water-recptacle and a packing surrounding it, the whole arranged to operate in the manner and for the purpose specified.

In witness whereof I have hereunto signed my name in the presence of two subscribing witnesses.

JAMES B. LONG.

Witnesses:
R. F. OSGOOD,
P. A. COSTICH.